Patented Feb. 13, 1934

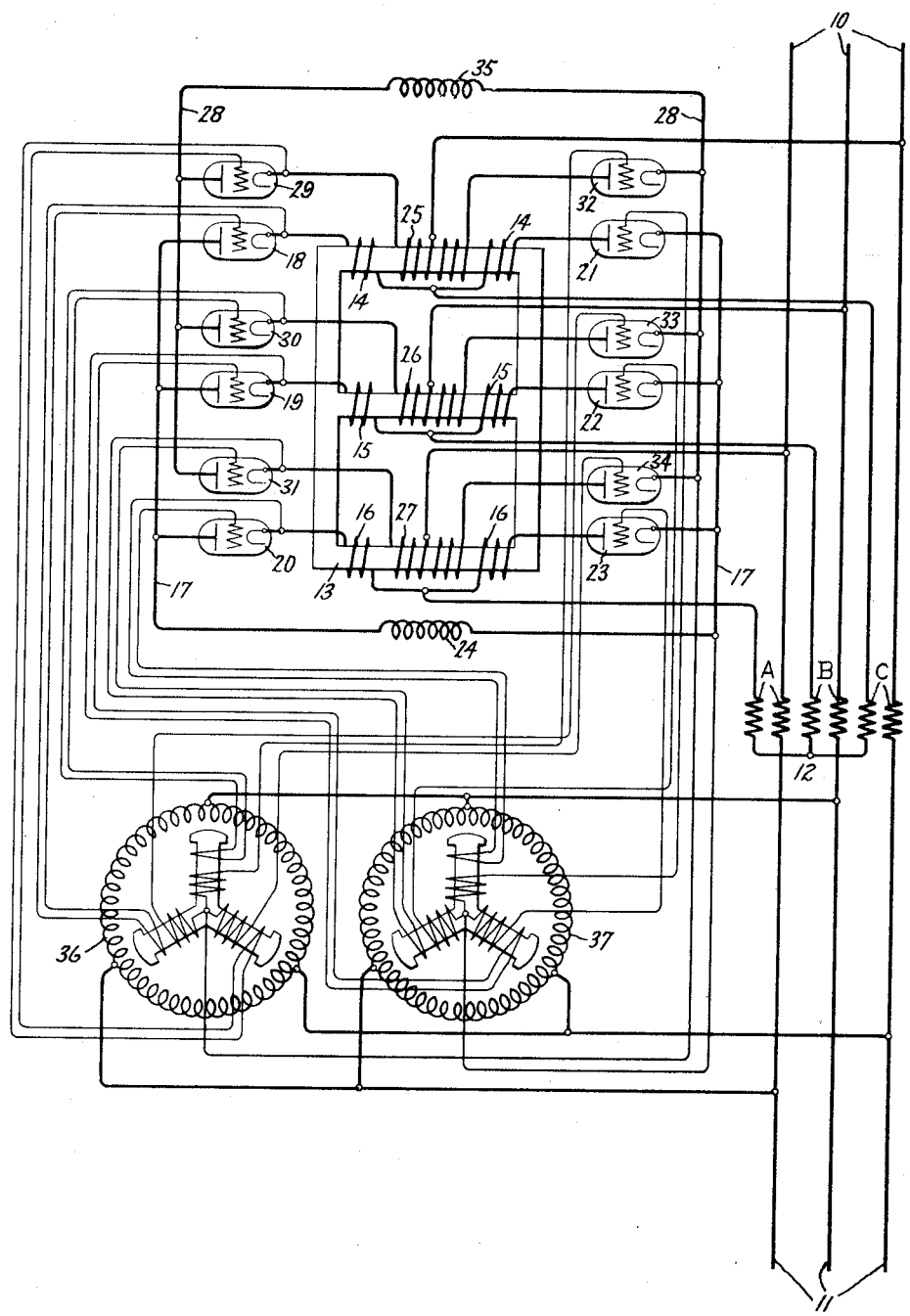

1,947,231

UNITED STATES PATENT OFFICE 1,947,231

ELECTRIC TRANSLATING CIRCUITS

Camil A. Sabbah, Schenectady, N. Y., assignor to General Electric Company, a corporation of New York Application January 16, 1932. Serial No. 587,144
Renewed July 8, 1933

7 Claims. (Cl. 172—246)

My invention relates to electric translating circuits and more particularly to such circuits including electric valves for improving the power factor of an alternating current circuit.

In the distribution of alternating current energy it is well known that the majority of consumption circuits comprise inductive loads which draw lagging current from the alternating current supply circuit. In the distribution of substantial amounts of energy over any considerable distance, however, the low power factor occasioned by inductive loads causes an increase in the copper losses, a decrease in the stability of the system and other disadvantages well known to those skilled in the art. In certain cases the power factor of such a system has been improved by the use of synchronous condensers or fixed capacitors in circuit with the transmission system. My invention relates to a power factor improving arrangement in which the power factor of the current drawn from an alternating current circuit may be controlled by means of an electric valve converting apparatus.

It is an object of my invention therefore to provide an improved alternating current translating circuit in which the power factor of the current drawn from the circuit may be determined by means of fixed impedance connected in series circuit relation with the alternating current circuit.

It is another object of my invention to provide an improved alternating current translating circuit in which the power factor of the current drawn from the alternating current circuit may be maintained at any predetermined value.

It is a further object of my invention to provide an improved alternating current translating circuit by means of which the power factor of the current drawn from the circuit may be controlled by means of an electric power converting apparatus connected in series circuit relation with the alternating current circuit.

In accordance with one embodiment of my invention an alternating current load circuit is interconnected with an alternating current supply circuit through a series transformer bank, the secondary windings of which are connected to be short circuited through an electric valve rectifier. By properly controlling the phase relation of the several valve currents of the rectifier, the phase of the current flowing in the series transformer, and thus the phase of the main load current, may be maintained at any predetermined value. In case electric valves of the vapor electric discharge type are utilized in the rectifier, auxiliary means is provided for commutating the current between the valves under any desired power factor conditions on the alternating current circuit.

For a better understanding of my invention together with other and further objects thereof, reference is had to the following description taken in connection with the accompanying drawing and its scope will be pointed out in the appended claims. The single figure of the accompanying drawing illustrates an arrangement for controlling the power factor of alternating current drawn from a three-phase alternating current supply circuit.

Referring now to the drawing, there is illustrated an arrangement for controlling the power factor of the current drawn by a three-phase alternating current load circuit 10 from a three-phase alternating current supply circuit 11. This apparatus includes a three-phase series transformer bank 12, each of the several phases A, B and C of which has a primary winding interconnecting one phase of the load and supply circuits. The secondary windings of the several phases A, B and C are connected in Y and arranged to be short circuited through a polyphase rectifier of any of the several types well known in the art, although I prefer to use a rectifier of the type disclosed and claimed in my copending application Serial No. 430,735, filed February 24, 1930, and assigned to the same assignee as the present application. A rectifier of this type is illustrated in the drawing, comprising a three-legged magnetic core member 13, the several branches of which carry inductive windings 14, 15 and 16, each provided with an electrical midpoint connected to one phase of the secondary network of the transformer bank 12. The terminals of the inductive windings 14, 15 and 16 of one polarity are connected to one side of the direct current circuit 17 of the rectifier through electric valves 18, 19 and 20, while the terminals of these windings of opposite polarity are connected to the other side of the direct current circuit 17 through electric valves 21, 22 and 23, respectively. The direct current circuit 17 is preferably short-circuited through a reactance device 24. Each of the several electric valves 18–23, inclusive, is provided with an anode, a cathode and a control grid, and may be of any of the several types well known in the art, although I prefer to use valves of the vapor electric discharge type because of the relatively large amounts of power which may be handled at ordinary operating voltages. However, in case valves of the vapor electric discharge type are utilized, the current cannot be commutated between the valves under certain power factor conditions by the operation of the grid circuits alone, in which case external commutating means must be provided. This auxiliary commutating arrangement may be of any of the several types well known in the art, although I prefer to use commutating means of the type disclosed and claimed in my copending application Serial No. 566,377, filed October 1, 1931, and assigned to the same assignee as the present application. In a commutating arrangement of this type there is provided an auxiliary rectifier similarly connected to the main rectifying apparatus and comprising inter-phase windings 25, 26 and 27 wound on the same magnetic core member as the windings 14, 15 and 16, respectively. The electrical midpoints of the windings 25, 26 and 27 are connected to phases of the supply or load circuit corresponding to the phase from which the associated main interphase windings 14, 15 and 16 are energized. Similarly, the terminals of the windings 25, 26 and 27 of one polarity are connected to one side of the direct current circuit 28 of the auxiliary rectifier through electric valves 29, 30 and 31, while the terminals of opposite polarity are connected to the other side of the direct current circuit 28 through electric valves 32, 33 and 34. The direct current circuit 28 is similarly short-circuited through a reactance device 35. The electric valves 29-34, inclusive, are preferably of the same type as the group of electric valves 18-23, inclusive. In order to limit the power drawn by the auxiliary commutating rectifier, the grids of the several electric valves 29-34, inclusive, are adapted to be energized with an alternating potential displaced in phase with respect to their anode potential, as for example, by energizing them from the alternating current circuit 11 through a three-phase rotary phase shifting transformer 36. Similarly the grids of the several electric valves 18-23 inclusive, are energized from the alternating current circuit 11 through a three-phase rotary phase shifting transformer 37 in order to determine the power factor of the current drawn by the alternating current load circuit 10.

The general principles of operation of the rectifier apparatus described above will be well understood by those skilled in the art, or may be found explained in detail in my above-mentioned copending application. The magnetic core member 13 maintains the total flux in each leg substantially constant, and thus aids in commutating the current between the several electric valves. It may be shown analytically that at any particular instant, four of the six electric valves are conductive so that each electric valve is conductive for 240 electrical degrees. As is well understood by those skilled in the art, the phase of the current transmitted through the rectifying apparatus may be controlled by controlling the phase relation of an alternating potential applied to the grids of the several electric valves 18—23, inclusive, as for example, by adjusting the rotary phase shifting transformer 37. Operating under certain power factor conditions, however, may involve the transfer of current from one valve to another valve at a point in a cycle when the electromotive force of the interphase windings interconnecting these valves opposes such commutation. For example, such operation may involve the transfer of load current from electric valve 18 to electric valve 19 when the terminal of the winding 15 connected to the valve 19 is positive with respect to the terminal of the winding 14 connected to the valve 18 so that the difference in electromotive force between the cathodes of the valves 18 and 19 is in such a direction as normally to oppose such a transfer of current. However, it has been found that an auxiliary similarly connected rectifier provided with interphase windings wound on the same magnetic core member as the windings of the main rectifying apparatus may be excited with potentials of proper phase relation to produce a magnetomotive force in the interphase core member 13 of the proper value and phase relation to induce a commutating potential in the windings 14, 15 and 16, and thus make possible the transfer of current between the several electric valves at points in the cycle of alternating potential when the potential of the windings 14, 15 and 16 interconnecting the valves opposes such commutation. By displacing the phase of the alternating potentials applied to the grids of the valves 29—34, inclusive, substantially in quadrature with their anode potentials, the current drawn by the auxiliary rectifier apparatus may be kept to a very low value and, if desired, may be substantially wattless. It will be apparent that the power factor of the current drawn by the main rectifying apparatus will be determined by the grid excitation of the electric valves 18—23, inclusive; that the phase relation of the current flowing in the secondary winding of the series transformer bank 12 will be correspondingly determined; and that this current will, in turn, determine the phase relation of the current flowing in the primary windings of the transformer bank 12, which is the current drawn by the load circuit 10. By properly adjusting the rotary phase shifting transformer 37 the phase relation of the current flowing in the series transformer bank 12 may be maintained at any predetermined value and thus the power factor of the current supplied by the supply circuit 11 substantially fixed. The main rectifying apparatus including the magnetic core member 13 thus comprises a variable impedance device, the reactive characteristic of which automatically varies with variations in the impedance of the load circuit 10 to produce an equivalent impedance across the supply circuit 11 which is non-reactive in its characteristics.

Although I have illustrated my invention as applied to an arrangement for regulating the power factor of a three-phase alternating current system, it will be obvious to those skilled in the art that it is equally applicable to alternating current systems of any number of phases, and that, while I have illustrated a particular rectifying circuit energized from the secondary windings of the series transformer bank, any of the several rectifying circuits well known in the art may be substituted therefor without departing from my invention.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, an alternating current circuit, electric valve means connected in series circuit relation with said alternating current circuit, and means for controlling the phase of the current transmitted by said valve means to determine the phase of the current in said alternating current circuit.

2. In combination, an alternating current circuit, electric valve rectifying means connected in series circuit relation with said alternating current circuit, and means for controlling the conductivity of said valves to determine the phase of the current in said alternating current circuit.

3. In combination, an alternating current circuit rectifying means connected in series circuit relation with said alternating current circuit and including a plurality of electric valves each provided with a control grid, means for impressing an alternating potential upon said grids, and means for varying the phase of said alternating potential to control the phase of the current drawn by said rectifying means and to determine the phase of the current in said alternating current circuit.

4. In combination, an alternating current circuit, rectifying means connected in series circuit relation with said alternating current circuit and including a plurality of vapor electric valves, means for commutating the current between the several valves of said rectifying means for any desired phase relation of the current drawn by said rectifying means, and means for controlling the phase of the current drawn by said rectifying means to determine the phase of the current in said alternating current circuit.

5. In combination, an alternating current circuit, rectifying means connected in series circuit relation with said alternating circuit and including a plurality of electric valves, a reactance device connected to short circuit the direct current side of said rectifying means, and means for controlling the phase of the current drawn by said rectifying means to maintain a predetermined phase relation between the current and potential of said alternating current circuit.

6. In combination, an alternating current supply circuit, an alternating current load circuit, a series transformer interconnecting said circuits, a rectifier energized from said transformer and including a plurality of vapor electric valves and an interphase inductive winding, a reactance device connected to short circuit the direct current side of said rectifier, an auxiliary electric valve rectifier energized from one of said supply and load circuits and connected similarly to said first mentioned rectifier and having an interphase inductive winding magnetically coupled to the interphase winding thereof to produce a potential to commutate the current between the valves of said first mentioned rectifier for any desired phase relation of the current drawn thereby, and means for varying the phase relation of the current drawn by said first mentioned rectifier to determine the phase relation between the current and potential of one of said alternating current circuits.

7. In combination, a polyphase alternating current supply circuit, a polyphase alternating current load circuit, a polyphase series transformer bank interconnecting said circuits, a rectifier energized from said transformer and including a plurality of vapor electric valves and a plurality of interphase inductive windings provided with a polyphase magnetic core member, a reactance device connected to short circuit the direct current side of said rectifier, an auxiliary polyphase electric valve rectifier energized from one of said supply and load circuits and provided with a plurality of similarly connected interphase windings mounted on said magnetic core member, and means for varying the phase relation of the current drawn by said first mentioned rectifier to determine the phase relation between the current and potential of said supply circuit.

CAMIL A. SABBAH.